Dec. 12, 1967  D. O. NASH ET AL  3,357,645
THRUST DIRECTING MEANS FOR AIRCRAFT
Filed Dec. 29, 1966
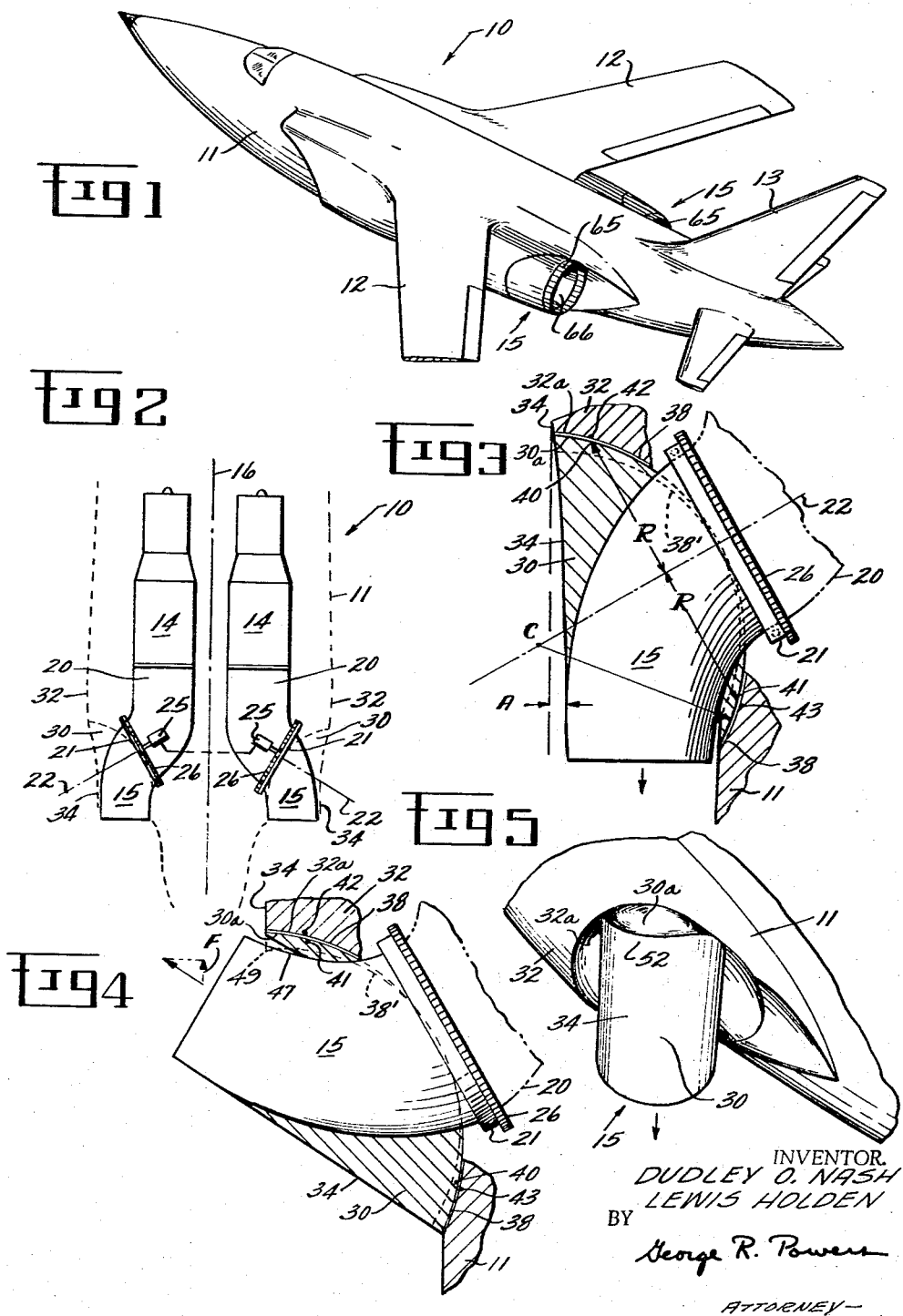
INVENTOR.
DUDLEY O. NASH
LEWIS HOLDEN
BY
George R. Powers
ATTORNEY United States Patent Office 3,357,645
Patented Dec. 12, 1967

3,357,645
THRUST DIRECTING MEANS FOR AIRCRAFT
Dudley O. Nash and Lewis Holden, Cincinnati, Ohio, assignors to General Electric Company, a corporation of New York
Filed Dec. 29, 1966, Ser. No. 605,649
12 Claims. (Cl. 239—265.25)

ABSTRACT OF THE DISCLOSURE

An aircraft powered by jet propulsion engines includes rotatable nozzles for selectively directing the motive fluid, the nozzles and their associated structure being both streamlined during cruise operation and capable of full thrust vectoring from forward to reverse thrust.

---

This application is a continuation-in-part of a copending application entitled, "Movable Nozzle," Ser. No. 449,034, filed on Apr. 19, 1965, now abandoned, in the name of Dudley Owen Nash et al. and assigned to the assignee of this application.

This invention relates to improved thrust directing means for aircraft and, more particularly, to thrust directing means permitting highly efficient flight performance during cruise operation.

To provide vertical and short take-off and landing capability, aircraft are sometimes equipped with rotatable thrust directing or vectoring devices such as louvered cascades and curved or elbow-shaped nozzles. By rotating the thrust directing devices, the motive fluid produced by jet propulsion engines can be discharged rearwardly for producing forward thrust during cruise operation, downwardly for producing substantial lift during take-off and landing maneuvers, and forwardly for producing reverse thrust to slow or stop the aircraft. In practice, however, it has been very difficult to provide full thrust vectoring capability from forward to reverse thrust without compromising the aerodynamic performance of the aircraft during cruise operation. More particularly, thrust vectoring devices used in the past have not been sufficiently streamlined for efficient operation and low drag during cruise operation, such devices typically projecting an excessive distance into the airstream or having excessive base areas and boattail angles. Various efforts have been made in the past to improve the aerodynamic configuration of such devices so as to thereby improve the performance of the aircraft. For example, fairings have been utilized for improving the streamlining; because of the requirement for substantial ranges of thrust vectoring, these arrangements have not been altogether satisfactory for a number of reasons. Typically, these prior art attempts at streamlining have left discontinuities or gaps in the faired surfaces in order to permit relative movement between the thrust directing device and the airframe, the discontinuities producing performance losses during cruise operation. Even with gaps between the fairings, these arrangements are not always capable of full thrust vectoring from forward to reverse thrust. Other prior art arrangements utilizing retractable aircraft fairings or flaps have avoided performance losses due to discontinuities in the aerodynamic surfaces, but have greatly added to the complexity and weight of the aircraft and have adversely affected aircraft reliability. Still other arrangements have provided smoothly faired surfaces without discontinuities therein, but this has been accomplished without actual streamlining by extending the thrust vectoring arrangements outwardly from the aircraft into the airstream.

It is an object of this invention to provide for jet propelled aircraft improved thrust directing means that permits highly efficient aircraft performance during cruise operation.

Another object is to provide thrust directing means that is both streamlined during cruise operation and capable of full thrust vectoring from forward to reverse thrust.

A further object of this invention is to provide the foregoing objects in a thrust directing means that does not adversely affect aircraft performance to any substantial extent when operating in modes other than cruise.

A still further object is to provide the foregoing objects in a thrust directing means that is relatively simple, lightweight, and reliable.

Briefly stated, in carrying out the invention in one form, a jet propelled aircraft is provided with a thrust directing device for discharging motive fluid to atmosphere. The thrust directing device is mounted for rotation about an axis through a range of positions including a forward thrust position and vectored thrust positions. A fixed fairing forming a portion of the airframe and a movable fairing carried by the thrust directing device abut to form a substantially continuous and aerodynamically streamlined exterior aircraft surface when the fluid turning device is in its forward trust or cruise position. To provide interference free movement between the fixed and movable fairings, the abutting edges of the fixed and movable fairings form a parting line disposed entirely on a surface of revolution generated about the axis of rotation of the thrust directing device. By a further aspect of the invention, the parting line is disposed entirely on a spherical surface, and the aerodynamically streamlined surface is a boattail surface converging in the rearward direction at a relatively small angle.

By still further aspects of the invention, the thrust directing device is an elbow-shaped nozzle, and the fixed and movable fairings are proportioned such that the nozzle can be rotated from forward to reverse thrust positions without interference between the nozzle and the fixed fairing. The nozzles are preferably utilized in pairs on opposite sides of the aircraft, and drive means are provided for simultaneously rotating the nozzles in opposite directions so as to maintain balanced lateral thrust components on the aircraft at all times.

While the novel features of this invention are set forth with particularity in the appended claims, the invention, both as to organization and content, will be better understood and appreciated, along with other objects and features thereof, from the following detailed description when taken in conjunction with the drawing, in which:

FIG. 1 is a pictorial view of an aircraft equipped with thrust directing nozzles formed in accordance with the present invention, the nozzles being shown in their forward thrust positions;

FIG. 2 is a partial schematic plan view of the aircraft of FIG. 1 illustrating the gas generating means and the thrust directing nozzles by solid lines and the outer aircraft and nozzle fairings by broken lines;

FIG. 3 is an enlarged view of one of the nozzle assemblies of FIG. 2, the nozzle being shown in its forward thrust position;

FIG. 4 is a view similar to FIG. 3 showing the nozzle in its reverse thrust position; and FIG. 5 is a pictorial view of the nozzle of FIGS. 3 and 4 in an intermediate, vertical thrust position.

Referring first to FIGS. 1 and 2, an aircraft 10 is illustrated, the aircraft 10 including an airframe comprising a fuselage 11, a pair of wings 12, and a tail assembly 13. A propulsion system comprising a pair of gas turbine engines 14 disposed within the fuselage 11 and a pair of elbow-shaped thrust vectoring nozzles 15 symmetrically disposed on opposite sides of the longitudinal aircraft axis 16 is provided for propelling the aircraft 10. The thrust directing nozzles 15 are each connected to the respective gas turbine engines 14 by an exhaust conduit 20 and a large diameter ring bearing 21 such that the hot motive fluid produced by the engines 14 is discharged to atmosphere by the nozzles 15 to produce thrust on the aircraft 10. In accordance with the present invention, the thrust vectoring nozzles 15 are rotatable about the axes 22 of the bearings 21 through a range of positions to vary the direction at which thrust is produced on the aircraft 10, drive motors 25 simultaneously rotating the nozzles 15 through suitable gearing 26 in opposite directions to maintain balanced lateral thrust components on the aircraft 10 at all times.

To provide highly efficient aircraft performance during cruise operation, the thrust directing nozzles 15 include movable fairings 30 secured thereto for cooperating with fixed fairings 32, which are actually portions of the fuselage 11, to form aerodynamically streamlined exterior aircraft surfaces 34 when the nozzles 15 are in the cruise positions illustrated by FIGS. 1 and 2. As better illustrated by FIG. 3, the fixed fairing 32 and the movable fairing 30 of each nozzle 15 abut to form the substantially continuous surface 34, which is an aerodynamically streamlined continuation of the fuselage 11 upstream of the nozzle 15. More particularly, the surface 34 is an aerodynamically efficient boattail surface which converges at a small angle A in the rearward direction. Since the boattail surface 34 is continuous with no substantial clearance between the abutting edges 30a and 32a of the movable and fixed fairings 30 and 32, respectively, the thrust directing arrangement of this invention provides highly efficient cruise operation.

The desirability of having an aerodynamically efficient boattail surface during cruise operation has been, of course, recognized in the past. However, previous efforts to provide such a surface have not been entirely satisfactory for reasons discussed above. The present invention makes possible the highly efficient boattail surface 34 in combination with full vectoring capability by forming the abutting fairings 30 and 32 such that their abutting edges 30a and 32a form a parting line 38 disposed entirely on a surface of revolution generated about the axis 22 of the bearing 21. This permits the elbow-shaped nozzle 15 to be rotated through 360 degrees without any interference between the movable and fixed fairings 30 and 32. To appreciate how disposition of the parting line 38 on a surface of revolution makes full rotation of the nozzle possible without interference between the fairings, attention is directed to FIGS. 3 and 4 where the parting line 38 formed by the fairing edges 30a and 32a is disposed on a spherical surface. It will be noted that points 40 and 41 on the edge 30a of the movable fairing 30 are in the same plane normal to the axis 22 and are at the same radius R from the axis 22. Points 42 and 43 are on the edge 32a of the fixed fairing 32 in the same plane as the points 40 and 41 and are aligned with the points 40 and 41, respectively, when the nozzle is in the forward thrust position of FIG. 3. The points 42 and 43 are, of course, slightly spaced from the corresponding points 40 and 41 in order to provide sufficient clearance between the fairings for movement, this continuous clearance actually forming the so-called parting line 38. With reference now to FIG. 4, it will be noted that the points 40 and 41 on the movable fairing 30 are aligned with the points 43 and 42, respectively, of the fixed fairing 32 when the nozzle 15 has been rotated through 180 degrees to its reverse thrust position in which the high energy motive fluid is discharged with a substantial forward component F, the spacing between the fairings remaining constant at all times. Because of this, the spacing may be made and maintained extremely small so that the aerodynamic efficiency of the boattail surface 34 during cruise operation will not be impaired.

To permit full vectoring capability from forward to reverse thrust, it is essential that the parting line 38 be disposed on a surface of revolution as just described. In addition, however, it is essential that the movable fairing 30 and the fixed fairing 32 be proportioned such that other elements such as the elbow-shaped nozzle 15 do not cause interference during rotation. For example, if the movable and fixed fairings 30 and 32 were proportioned to form a spherical parting surface 38′ as illustrated by broken lines by FIGS. 3 and 4, the nozzle 15 could not be moved to its reverse thrust position of FIG. 4 since the inside bend portion 47 of the nozzle 15 would interfere with the fixed fairing 32 from point 48 outwardly along the fairing edge 32a to the outer tip 49 of the fixed fairing 32 where the interface regions ends. Stated differently, it can be said that the nozzle 15 projects outwardly of the surface of revolution within the interface region, the nozzle 15 and the fixed fairing 32 thereby contacting and preventing full rotation of the nozzle. The result would be essentially similar if any portions of the fixed aircraft structure extended inwardly of the surface of revolution within the interface region. Of course, in the event that full vectoring capability from forward to reverse thrust is not required, interference between the nozzle 15 and the fixed fairing 32 need be avoided only within the desired range of relative positions.

Referring now to FIG. 5 wherein the nozzle 15 is illustrated in an intermediate, vertical thrust position, it will be noted that a portion 52 of the movable fairing 30 projects outwardly from the fuselage 11 into the airstream. This projection 52 increases aircraft drag during operation with the nozzle 15 in the intermediate, vertical thrust position (the aircraft 10 may, of course, have substantial forward velocity during vertical thrust operation), and it is therefore desirable to maintain this projection as small as possible within the configuration requirements discussed above. It has been found in accordance with the present invention that the various requirements, including minimum drag area during vertical thrust operation, can be best provided by forming the movable and fixed fairings 30 and 32 such that the parting line 38 of FIGS. 3 and 4 is disposed on a spherical surface of revolution. While it is possible to provide interference free rotation of the nozzle 15 with the parting line between the movable and fixed fairings disposed on surfaces of revolution other than spherical, a conical surface being one such surface, it has been found that surfaces other than spherical typically result in increased drag area during vertical thrust operation. The spherical surface of revolution also provides another important advantage in that the spherical interface will appear on conventional airframe contour drawings as circles as shown by FIGS. 3 and 4, thus assuring simple integration of the movable and fixed fairings. Thus, conventional contour drawings such as the horizontal Waterline sections of FIGS. 3 and 4 and vertical Butt and Station sections will show the spherical intersections as circles. The simplicity of integrating the movable and fixed fairings when the surface of revolution is spherical will be readily appreciated by comparing the simple circular intersections of FIGS. 3 and 4 with the complex intersections of other surfaces of revolution; for example, a conical surface of revolution would appear in the conventional airframe contour drawings as elliptical and parabolic intersections.

If desired, the nozzle 15 may be provided with variable flaps 65 as illustrated by FIG. 1, the flaps 65 controlling the nozzle outlet area 66 so as to permit operation through a wide range of aircraft speeds, including supersonic operation.

The thrust directing means of this invention has been disclosed as part of a fuselage mounted propulsion system in which a pair of elbow-shaped nozzles 15 are mounted on opposite sides of the fuselage 11 and are interconnected by drive motors 25 for simultaneous rotation. While this arrangement is preferred in order to maintain balanced lateral thrust loads on the aircraft 10 at all times, it will be appreciated that these is no reason why the invention could not be applied to a thrust directing means comprising either a single elbow-shaped nozzle or other fluid turning devices such as louvered cascades. It will also be appreciated that the present invention is applicable for use in wing mounted propulsion systems as well as in fuselage mounted systems.

From the foregoing, it will be appreciated that the thrust directing means of the present invention provides effective thrust vectoring without compromising aircraft performance during cruise operation. By disposing the parting line between the movable and fixed fairings of the thrust directing means on a spherical surface of revolution, other advantages such as substantially minimum drag under all operating conditions and simple integration of the movable and fixed fairings can be obtained.

It will be understood that the invention is not limited to the specific details of construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In an aircraft including an airframe and gas generating means for producing high energy motive fluid, thus directing means comprising:

at least one fluid turning device communicating with the gas generating means for receiving motive fluid therefrom and discharging the motive fluid to atmosphere, mounting means supporting said fluid turning device for rotation about an axis through a range of positions, said range of positions including a forward thrust position in which the motive fluid is discharged in a rearward direction relative to the aircraft, a reverse thrust position in which the motive fluid is discharged in a direction having at least a substantial component in the forward direction relative to the aircraft, and vectored thrust positions between said forward and reverse thrust positions in which the motive fluid is discharged in other directions relative to the aircraft, a fixed fairing forming a portion of the airframe, and a movable fairing secured to and carried by said fluid turning device, said fixed and movable fairings abutting to form a substantially continuous and aerodynamically streamlined exterior aircraft surface when said fluid turning device is in said forward thrust position, said surface being a boattail surface converging in the rearward direction at a relatively small angle, the abutting edges of said fixed and movable fairings forming a parting line disposed entirely on a surface of revolution generated about the axis of rotation of said fluid turning device, whereby said fluid turning device can be rotated through said range of positions without interference between said fixed and movable fairings.

2. Thrust directing means as defined by claim 1 wherein said mounting means for supporting said fluid turning device comprises a bearing assembly interconnecting said fluid turning device and the gas generating means, said thrust directing means further comprising drive means for rotating said fluid turning device about the axis of said bearing assembly.

3. Thrust directing means as defined by claim 1 wherein the surface of revolution upon which said parting line is disposed in a spherical surface.

4. Thrust directing means as defined by claim 1 wherein said fluid turning device is an elbow-shaped nozzle, said fixed and movable fairings being proportioned such that said elbow-shaped nozzle can be rotated through said range of positions without interference between said elbow-shaped nozzle and said fixed fairing.

5. Thrust directing means as defined by claim 4 wherein the surface of revolution upon which said parting line is disposed is a spherical surface.

6. Thrust directing means as defined by claim 5 wherein the continuous and aerodynamically smooth surface formed by said fixed and movable fairings is a boattail surface converging in the rearward direction at a relatively small angle.

7. Thrust directing means as defined by claim 6 wherein said mounting means for supporting said elbow-shaped nozzle comprises a bearing assembly interconnecting said elbow-shaped nozzle and the gas generating means, said thrust directing means further comprising drive means for rotating said elbow-shaped nozzle about the axis of said bearing assembly.

8. Thrust directing means as defined by claim 1 including a pair of turning devices comprising elbow-shaped nozzles symmetrically disposed on opposite side of the longitudinal axis of the aircraft, said fixed and movable fairings being proportioned such that each of said elbow-shaped nozzles can be rotated through said range of positions without interference between the elbow-shaped nozzle and the respective fixed fairing.

9. Thrust directing means as defined by claim 8 wherein the surface of revolution upon which the parting line of each nozzle is disposed is a spherical surface.

10. Thrust directing means as defined by claim 9 wherein the continuous and aerodynamically smooth surface formed by said fixed and movable fairings of each nozzle is a boattail surface converging in the rearward direction at a relatively small angle.

11. Thrust directing means as defined by claim 10 wherein said mounting means for supporting each of said elbow-shaped nozzles comprises a bearing assembly interconnecting the elbow-shaped nozzle and the gas generating means, said thrust directing means further comprising drive means for simultaneously rotating said elbow-shaped nozzles in opposite directions about the axes of said bearing assemblies so as to maintain balanced lateral thrust components on the aircraft at all times.

12. Thrust directing means as defined by claim 11 wherein said elbow-shaped nozzles have movable flaps for varying the exhaust area thereof.

References Cited

UNITED STATES PATENTS

| 2,780,424 | 2/1957 | Price | 244—12 |
| 3,025,667 | 3/1962 | Moorehead | 239—265.25 |
| 3,056,258 | 10/1962 | Marchant et al. | 60—232 |
| 3,243,125 | 3/1966 | Latulippe | 239—265.25 |

FOREIGN PATENTS

| 1,022,847 | 7/1944 | Germany. |

M. HENSON WOOD, Jr., *Primary Examiner.*

M. MAR, *Assistant Examiner.*